US012509173B2

(12) United States Patent
Heinemann

(10) Patent No.: US 12,509,173 B2
(45) Date of Patent: Dec. 30, 2025

(54) TWO-WHEELER LOCK

(71) Applicant: ABUS August Bremicker Söhne KG, Wetter-Volmarstein (DE)

(72) Inventor: Stefan Heinemann, Wetter (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 165 days.

(21) Appl. No.: 18/267,528

(22) PCT Filed: Dec. 3, 2021

(86) PCT No.: PCT/EP2021/084205
§ 371 (c)(1),
(2) Date: Jun. 15, 2023

(87) PCT Pub. No.: WO2022/128537
PCT Pub. Date: Jun. 23, 2022

(65) Prior Publication Data

US 2024/0101204 A1 Mar. 28, 2024

(30) Foreign Application Priority Data

Dec. 18, 2020 (DE) ..................... 10 2020 134 110.5

(51) Int. Cl.
*B62H 5/10* (2006.01)
*B62H 5/00* (2006.01)

(52) U.S. Cl.
CPC ............... *B62H 5/10* (2013.01); *B62H 5/003* (2013.01)

(58) Field of Classification Search
CPC ...... E05B 71/00; E05B 67/003; E05B 67/006; E05B 73/0005; E05B 73/0011
See application file for complete search history.

(56) References Cited

U.S. PATENT DOCUMENTS 5,007,260 A * 4/1991 Sharp ..................... B62H 5/001 70/231

FOREIGN PATENT DOCUMENTS

| | | | |
|---|---|---|---|
| CN | 102182368 | A | 9/2011 |
| CN | 105298264 | A | 2/2016 |
| CN | 106256674 | A | 12/2016 |
| CN | 207245409 | U | 4/2018 |
| DE | 4000430 | A1 * | 7/1991 |
| DE | 102015103170 | A1 | 9/2016 |
| EP | 0520154 | A1 | 12/1992 |
| JP | 2580422 | Y2 | 10/1994 |
| JP | H10280774 | A | 10/1998 |
| JP | 2006037431 | A | 2/2006 |
| TW | I699474 | B | 7/2020 |

* cited by examiner

*Primary Examiner* — Christine M Mills
*Assistant Examiner* — Yahya Sidky
(74) *Attorney, Agent, or Firm* — Dickinson Wright PLLC

(57) ABSTRACT

A two-wheeler lock includes a locking unit having two opposite end faces, and a sleeve having a longitudinal axis and two opposite axial ends, wherein a bolt receiver is provided at the first end face and a rotatable lock cylinder, which actuates a locking element is provided at the second end face. The sleeve has an end wall at the first axial end and is open at the second axial end, wherein the locking unit can be introduced, with the lock cylinder or the bolt receiver at the front, into the sleeve. In the introduced state, the locking unit can be fixed in the sleeve a fixing device. The end wall of the sleeve has a passage opening for a key to be inserted into the lock cylinder or a bolt to be inserted into the bolt receiver.

17 Claims, 7 Drawing Sheets

TWO-WHEELER LOCK

FIELD

The present disclosure relates to a two-wheeler lock, in particular to a bicycle lock, for an insertion unit, in particular for an insertion cable or an insertion chain.

BACKGROUND

Locks for two-wheelers such as bicycles, in particular pedelecs, and motorcycles for theft protection are known in various designs, for example in the form of hoop locks, folding locks, cable locks, or frame locks. Furthermore, insertion cables or insertion chains are known that are provided with a loop at the one end and with a bolt at the other end. To connect the two-wheeler to a fixed object such as a lamppost or a bicycle stand, the cable or the chain is first placed around the fixed object and then the bolt is led through the loop and is inserted into a bolt securing device fastened to the two-wheeler.

It is known from the document DE 10 2015 103 170 A1 to integrate such a bolt securing device in a frame lock. However, the bolt securing device is thereby fixed to the attachment location of the frame lock to the bicycle. Furthermore, the complexity of the frame lock is increased by the integration of the bolt securing device in the frame lock.

SUMMARY

It is therefore an object of the present disclosure to provide a two-wheeler lock for an insertion unit that may be used independently of a frame lock, that may be manufactured inexpensively, and that may be easily assembled.

The object is satisfied by a two-wheeler lock having features according to the present disclosure.

A two-wheeler lock in accordance with the present disclosure comprises a locking unit, which has two opposite end faces, and a sleeve that is provided for attachment to or in a frame of the two-wheeler and that has a longitudinal axis and two opposite axial ends, wherein a bolt receiver, into which a bolt of an insertion unit may be inserted and with which an adjustable locking element is associated, is provided at the first end face of the locking unit in order to selectively secure a bolt inserted into the bolt receiver against a removal or to release it for a removal, wherein a lock cylinder, which is rotatable by way of a key and by which the locking element may be actuated, is provided at the second end face of the locking unit, wherein the sleeve is provided with an end wall at the first axial end and is open at the second axial end, wherein the locking unit may be introduced, in particular selectively introduced, with the lock cylinder or the bolt receiver at the front end of introduction, into the sleeve, wherein, in the introduced state, the locking unit may be fixed in the sleeve by way of a fixing device, and wherein the end wall of the sleeve is provided with a passage opening for the leading through of a key to be inserted into the lock cylinder or of a bolt to be inserted into the bolt receiver.

The insertion unit may be wrapped around a fixed object such as a lamppost and may then be anchored to the locking unit by inserting the bolt into the bolt receiver. If the locking unit is fixed in the sleeve and the sleeve is fixedly connected to the frame of the two-wheeler, a reliable securing of the two-wheeler to the fixed object results when the bolt is inserted and the locking element is in the locked position. The assembly is simple because the locking unit only has to be introduced into the sleeve and fixed therein. The sleeve may be pre-assembled at or in the frame. The fixing device is preferably designed for a releasable fixing such that the locking unit may be easily replaced if required. The locking unit may be selectively introduced with the lock cylinder or the bolt receiver at the front end of introduction, only with the lock cylinder at the front, or only with the bolt receiver at the front, into the sleeve.

The insertion unit may, for example, be an insertion cable, an insertion chain, an insertion joint bar, or the like.

A sleeve that is open at one side may be produced easily and inexpensively. The sleeve may comprise a tubular section extending along the longitudinal axis, for example in the form of a hollow profile composed of steel. The locking unit is in particular elongate.

A two-wheeler lock in accordance with the present disclosure may comprise a cover for covering the open axial end of the sleeve, wherein the cover may be, in particular releasably, fastened to the sleeve and has a cover opening for the leading through of a bolt to be inserted into the bolt receiver or of a key to be inserted into the lock cylinder. The sleeve may be closed by the cover in order to enclose the locking unit and to prevent an impairment of the locking unit by dirt and moisture. A sealing element, for example a rubber ring, may be arranged at the cover for this purpose.

The cover may be screwable onto the sleeve to enable a fast and simple attachment and release.

In accordance with an embodiment of the present disclosure, a screw mount, which is formed at the sleeve and which defines a screw axis extending parallel to the longitudinal axis of the sleeve, is provided for screwing the cover onto the sleeve. The screw mount is preferably arranged such that the screw head is covered by a collar formed at the bolt when the cover is screwed on and the bolt is inserted. When the two-wheeler lock is locked, it is therefore impossible to unscrew the cover.

A two-wheeler lock in accordance with the present disclosure may comprise a closure for covering the open axial end of the sleeve, wherein the closure is fixedly connected to the locking unit or is designed in one piece therewith and is arranged at that end face of the locking unit which forms a trailing end on the introduction of the locking unit into the sleeve. In this design, a separate cover does not have to be provided.

A specific embodiment of the present disclosure provides that the fixing device has a screw for screwing the locking unit introduced into the sleeve to the sleeve. This enables a fast and simple fixing and an equally quick and easy release. For example, the fixing device may comprise at least one leadthrough provided at the locking unit and at least one screw mount provided at the sleeve, wherein the leadthrough is aligned with the screw mount when the locking unit is introduced into the sleeve. In this respect, the at least one screw mount may define a screw axis that is oriented transversely to the longitudinal axis of the sleeve. A corresponding recess may be provided in the sleeve for the leading through of a screwing tool.

A further embodiment of the present disclosure provides that the locking unit has a housing for accommodating the bolt receiver, the locking element, and the lock cylinder, wherein a flange, which may be screwed to an inwardly disposed web of the sleeve, is formed at the housing. A stable hold results due to a contact, in particular a contact over an area, of the flange with the web. The web may in particular be formed at an inner wall section of the sleeve. A screw mount for a screw to be screwed in in the direction of the longitudinal axis of the sleeve may also be provided at the web such that the web may also be used for fastening a cover as described above. The web preferably extends in the direction of the longitudinal axis of the sleeve.

In accordance with a further embodiment of the present disclosure, the fixing device has a latching mechanism for latching the locking unit introduced into the sleeve to the sleeve. This permits a fixing without tools. For example, the fixing device may have at least one latch recess and a latch projection cooperating therewith, wherein the latch recess is formed in the sleeve and the latch projection projects from the locking unit, or vice versa. To ensure a stable fixing, two arrangements of a latch recess and a latch projection spaced apart from one another with respect to the longitudinal axis may be provided.

The sleeve is preferably configured for a welding to a frame of a two-wheeler or for a welding into a recess of a frame of a two-wheeler. It is generally not possible for a thief to detach a fixedly welded sleeve from the frame.

The present disclosure also relates to a two-wheeler, in particular a bicycle, comprising a frame and at least two wheels supported thereat, wherein a two-wheeler lock as described above is fastened to or in the frame.

The two-wheeler lock may comprise an insertion unit that has a bolt and that is configured for insertion into the bolt receiver. The handling of the insertion unit is simple.

Provision may be made that the two-wheeler comprises pedal cranks for generating a drive torque and the two-wheeler lock is fastened to or in the frame such that the bolt of the insertion unit introduced into the bolt receiver projects into a movement path of a pedal crank. When attempting to pedal, the pedal crank abuts the bolt. The bolt itself thus acts as an additional safeguard against theft because a riding away with the two-wheeler designed in such a manner is not even possible when the insertion unit is cut through. In contrast, a cutting through of the bolt directly at the frame is only possible with difficulty.

Further developments of the present disclosure may also be seen from the following description and drawings.

BRIEF DESCRIPTION OF THE DRAWINGS

The present disclosure will be described in the following by way of example with reference to the drawings, in which.

DETAILED DESCRIPTION

Figure 1:
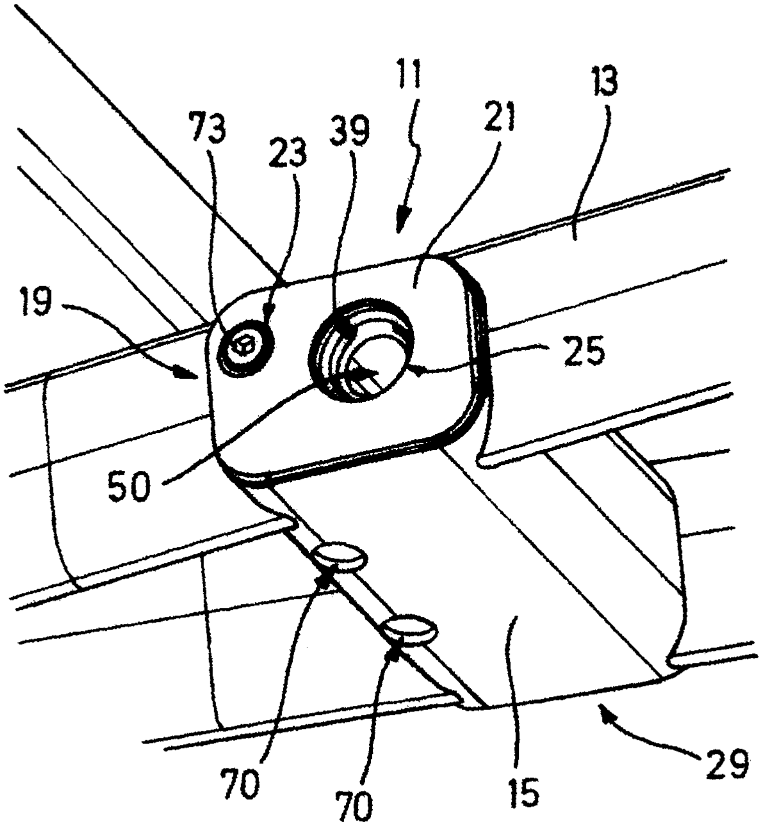
FIG. 1 is a front perspective view of a two-wheeler lock, in particular a bicycle lock, in accordance with a first embodiment of the present disclosure.
Figure 2:
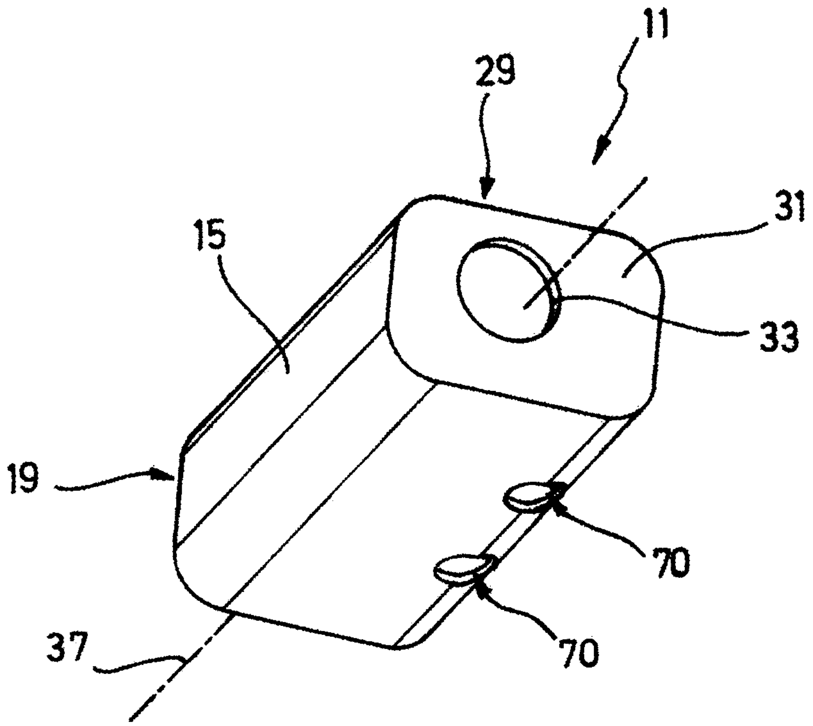
FIG. 2 is a rear view of the two-wheeler lock in accordance with FIG. 1 from the rear.

The two-wheeler lock 11, in particular a bicycle lock, shown in FIG. 1 and designed in accordance with a first embodiment of the present disclosure is integrated into a frame 13 of a bicycle. Specifically, the lock 11 comprises an elongate sleeve 15 that is welded into the frame 13. The sleeve 15 is preferably produced from a steel section. At a first axial end 29, the sleeve 15 is closed by an end wall 31 (FIG. 2) that is provided with a passage opening 33. At its opposite second axial end 19, the sleeve 15 is open and is covered by a cover 21 (FIG. 1). In this respect, the term "axial" is to be understood with respect to a longitudinal axis 37 of the sleeve 15. The cover 21 is provided with a screw hole 23 and a cover opening 25.

Figure 3:
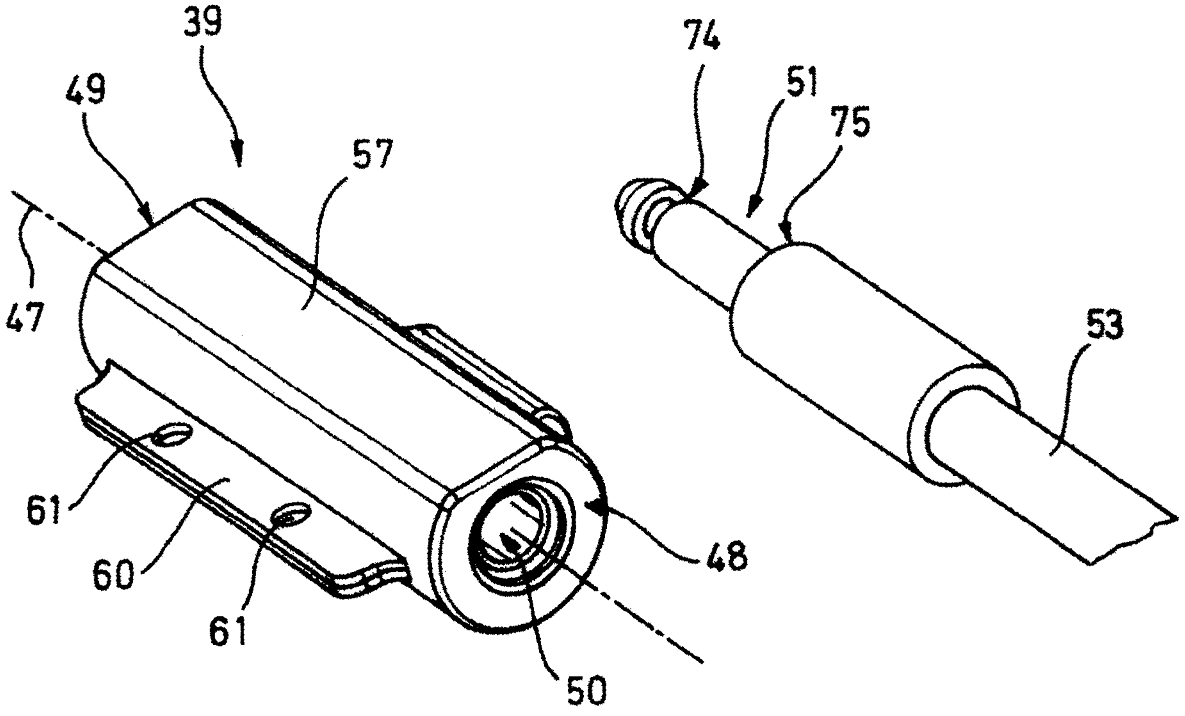
FIG. 3 is front view of a locking unit of the two-wheeler lock designed in accordance with FIG. 1 together with a bolt to be inserted into a bolt receiver of the locking unit.
Figure 4:
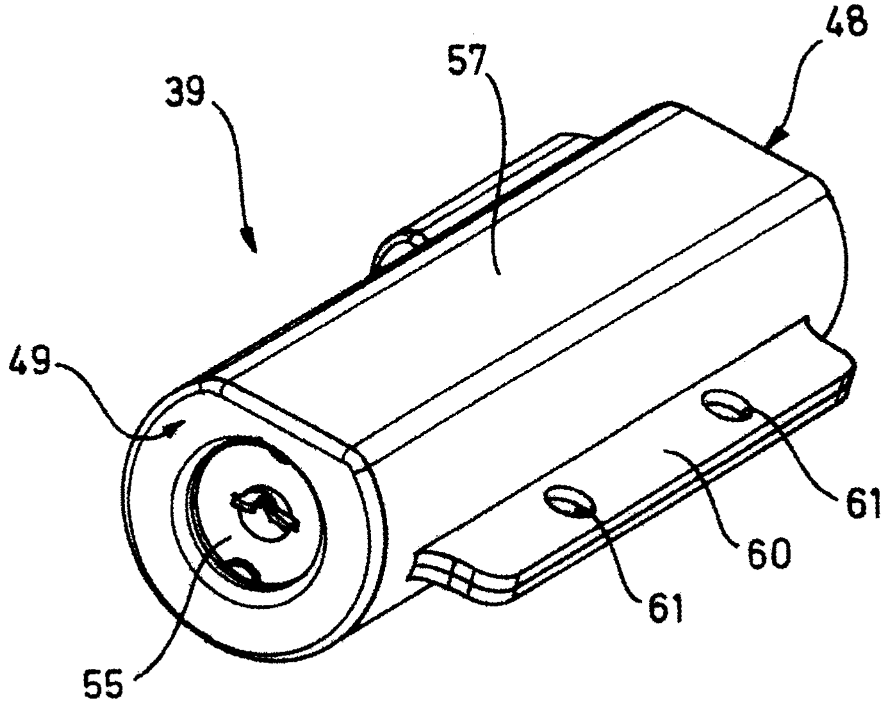
FIG. 4 is a rear view of the locking unit in accordance with FIG. 3.

A locking unit 39 of the two-wheeler lock 11, which is shown individually in FIGS. 3 and 4, is located in the sleeve 15. It has a longitudinal axis 47 and two opposite end faces 48, 49.

At the end face 48 facing the viewer in FIG. 3, a bolt receiver 50 is provided into which a bolt 51 of an insertion unit 53, which is only partly shown, may be inserted. In the embodiment example shown, the insertion unit 53 is an insertion cable. An adjustable locking element is associated with the bolt receiver 50 in a generally known manner, but is not visible in the Figures. The locking element is adjustable between a locked position and a release position and serves to selectively secure the bolt 51 inserted into the bolt receiver 50 against a removal or to release it for a removal. The locking mechanism may, for example, be designed as disclosed in DE 10 2015 103 170 A1.

To actuate the locking element at least into the release position, a rotatable lock cylinder 55 (FIG. 4) is provided that is located at the second end face 49 of the locking unit 39 and that may be rotated by means of a key, not shown. The bolt receiver 50 and the lock cylinder 55 are accommodated in a housing 57 of the locking unit 39 that is preferably produced from plastic.

On the assembly of the two-wheeler lock 11, the locking unit 39 is introduced, with the lock cylinder 55 at the front, through the open axial end 19 into the sleeve 15, and indeed in the axial direction. In the introduced state, the longitudinal axis 47 of the locking unit 39 extends in parallel with the longitudinal axis 37 of the sleeve 15. The lock cylinder 55 is further aligned with the passage opening 33.

Subsequently, the locking unit 39 is screwed to the sleeve 15. For this purpose, a flange 60 is formed at the housing 57 of the locking unit 39, extends parallel to the longitudinal axis 47 of the locking unit 39, and is provided with two leadthroughs 61. Screws, not shown, may be guided through said leadthroughs and may be screwed into screw mounts 63 (FIG. 5) of the sleeve 15 transversely to the longitudinal axis 37. As may be recognized in the cover-free front view shown in FIG. 5, the screw mounts 63 extending transversely to the longitudinal axis 37 are formed in a web 65 that is formed at an inner wall 67 of the sleeve 15 and that extends along the longitudinal axis 37 of the sleeve 15. A screw mount 69 extending parallel to the longitudinal axis 37 is also provided in the web 65. In the introduced state of the locking unit 39, the flange 60 contacts the web 65 in a flush manner and the leadthroughs 61 are aligned with the screw mounts 63 such that the locking unit 39 may be screwed tight in the sleeve 15. This means that the leadthroughs 61 and the screw mounts 63, together with the associated screws, form a fixing device for fixing the locking unit 39 in the sleeve 15. Two access openings 70 are formed in the sleeve 15 for handling a screw tool (not shown), as may be recognized in FIGS. 1 and 2. In accordance with an embodiment, not shown, the access openings are provided with receivers for countersunk heads of countersunk screws. These receivers may be provided with seals to prevent moisture from entering the sleeve.

Figure 5:
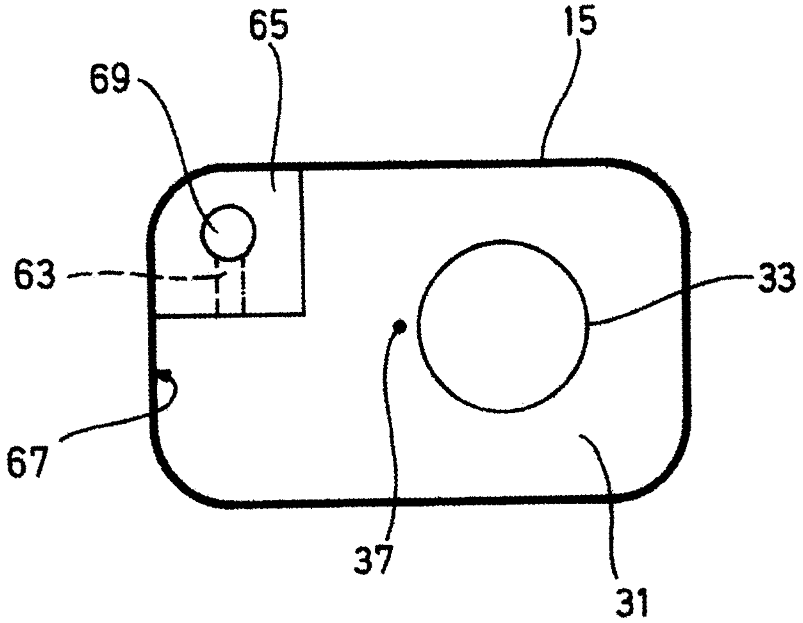
FIG. 5 is a simplified front view of a sleeve of the two-wheeler lock of FIG. 1 shown without a cover.

When the locking unit 39 is screwed tight in the sleeve 15, the cover 21 is placed onto the open axial end 19 of the sleeve 15 such that the screw hole 23 is aligned with the screw mount 69 (FIG. 5). By screwing in a screw 73, the cover 21 may then be fixedly connected to the sleeve 15, as shown in FIG. 1, wherein the bolt receiver 50 is aligned with the cover opening 25.

To lock the bicycle, the insertion unit 53 is fastened to a lamppost or a similar object and the bolt 51 is inserted into the bolt receiver 50. The locking element is placed in the locked position, either due to a preload, as is the case in DE 10 2015 103 170 A1, or by rotating the lock cylinder 55 such that the bolt 51 is fixedly anchored to the frame 13 via the bolt receiver 50 and the sleeve 15. In the locked position, the locking element in this respect projects into the bolt receiver 50 such that it engages into a groove 74 of the bolt 51. In this state of the two-wheeler lock 11, the screw 73 is covered by a collar 75 of the bolt 51 such that it is not accessible. A loosening of the screw 73 and a removal of the cover 21, for example for a replacement of the locking unit 39, are only possible when the bolt 51 is removed from the bolt receiver 50.

To release the bicycle, the locking element is moved into the release position by rotating the lock cylinder 55 using a key and the bolt 51 is removed from the bolt receiver 50.

Figure 6:
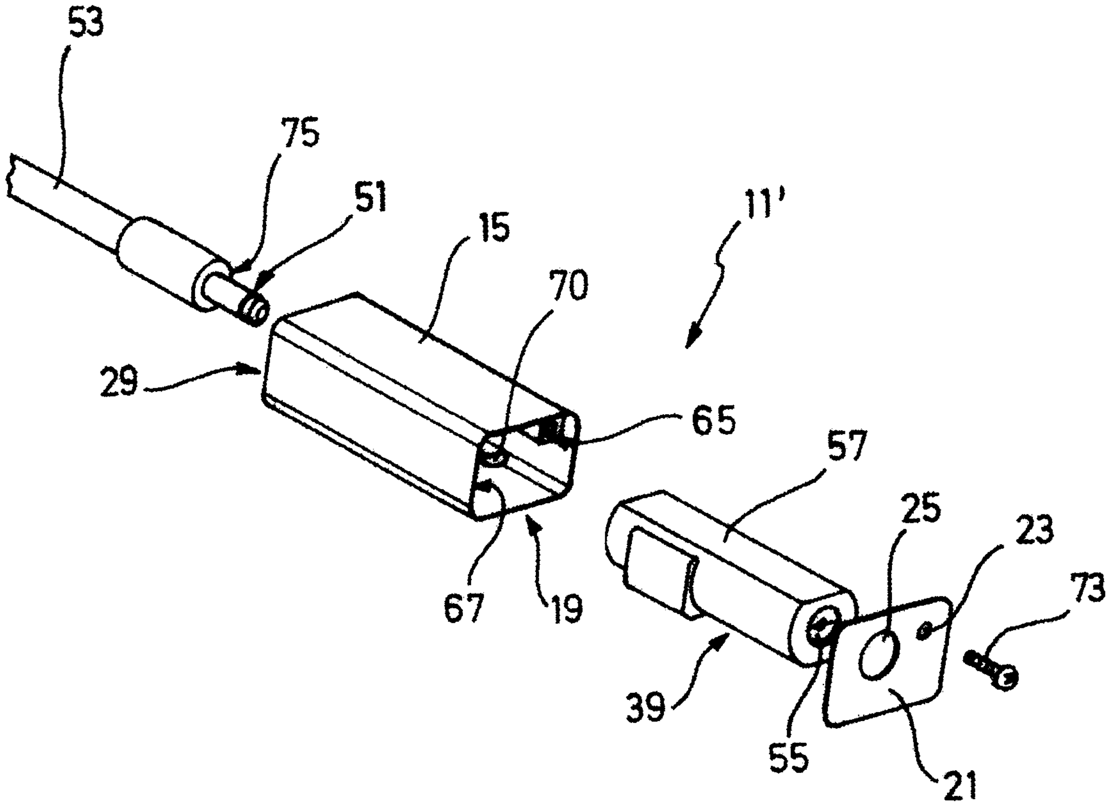
FIG. 6 is an exploded representation of a two-wheeler lock in accordance with a second embodiment of the present disclosure.

A second embodiment of a two-wheeler lock 11' in accordance with the present disclosure is shown in FIG. 6, wherein identical or equivalent components are designated by the same reference numerals as in FIGS. 1-5. In contrast to the first embodiment, in the two-wheeler lock 11' shown in FIG. 6, the locking unit 39 is to be introduced into the sleeve 15 with the bolt receiver 50 at the front. The arrangement of the web 65 is selected accordingly. When the locking unit 39 is introduced into the sleeve 15, the cover opening 25 is aligned with the lock cylinder 55 while the passage opening 33 (FIG. 2) is aligned with the bolt receiver 50. In another respect, the two-wheeler lock 11' is assembled and used in the same manner as the two-wheeler lock 11 in accordance with the first embodiment. Because the head of the screw 73 is freely accessible in the embodiment example shown in FIG. 6, the cover 21 may also be removed in the locked state of the two-wheeler lock 11'. However, a removal of the locking unit 39 from the sleeve 15 is thereby not possible even if the screws provided for connecting the flange 60 to the web 65 are additionally also loosened. As long as the bolt 51 is located in the bolt receiver 50 in a manner secured by the locking element and the collar 75 of the bolt 51 engages over the passage opening 33 of the end wall 31 of the sleeve 15, the locking unit 39 is held in the sleeve 15.

Figure 7:
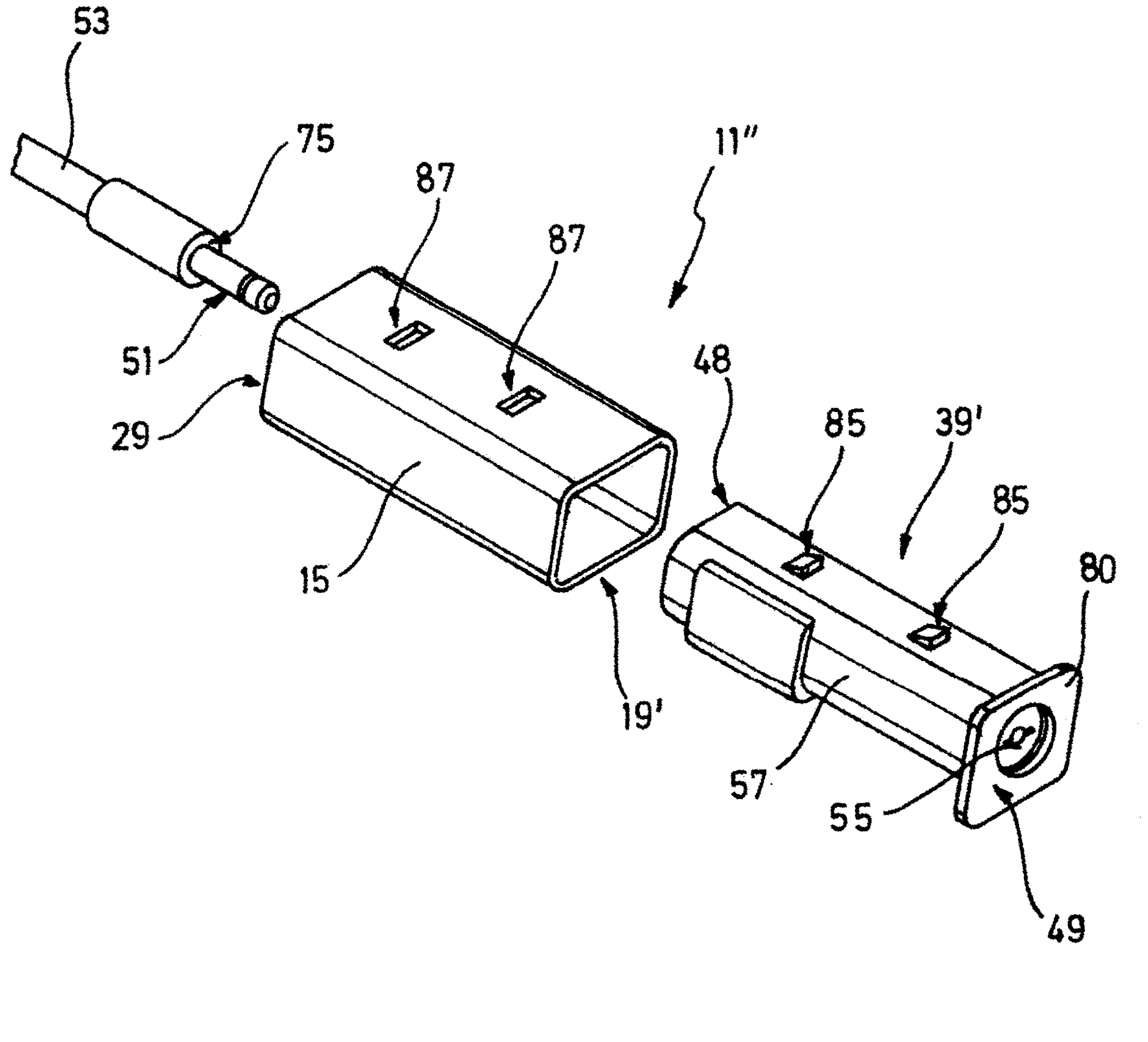
FIG. 7 is an exploded representation of a two-wheeler lock accordance with a third embodiment of the present disclosure.

A third embodiment of a two-wheeler lock 11" in accordance with the present disclosure is shown in FIG. 7. As in the second embodiment, in the two-wheeler lock 11" shown in FIG. 7, the locking unit 39' is to be introduced into the sleeve 15 with the bolt receiver 50 at the front. Instead of a separate cover, a closure 80, for example a plate-like closure 80, which is connected to the locking unit 39', is provided for covering the open axial end 19 of the sleeve 15. The closure 80 may in particular be molded to the housing 57 of the locking unit 39'.

Furthermore, two latch noses 85 are molded to the housing 57. They cooperate with latch recesses 87 of the sleeve 15. On the introduction of the locking unit 39' into the sleeve 15, the latch noses 85 snap into the latch recesses 87 and hold the locking unit 39' in the sleeve 15. Accordingly, a screwing on of the closure 80 at the sleeve 15 is not necessary. The fixing device for fixing the locking unit 39' in the sleeve 15 is therefore here not based on a screw connection, but on a latch connection.

REFERENCE NUMERAL LIST

11, 11', 11" two-wheeler lock
13 frame
15 sleeve
19 second axial end
21 cover
23 screw hole
25 cover opening
29 first axial end
31 end wall
33 passage opening
37 longitudinal axis of the sleeve
39, 39' locking unit
47 longitudinal axis of the locking unit
48 first end face
49 second end face
50 bolt receiver
51 bolt
53 insertion unit
55 lock cylinder
57 housing
60 flange
61 leadthrough
63 screw mount
65 web
67 inner wall
69 screw mount
70 access opening
73 screw
74 groove
75 collar
80 closure
85 latch nose
87 latch recess

The invention claimed is:

1. A two-wheeler lock for an insertion unit, said two-wheeler lock comprising:

a locking unit having two opposite end faces, and a sleeve for attachment to or in a frame of the two-wheeler, the sleeve having a longitudinal axis and two opposite axial ends, a bolt receiver disposed at the first end face of the locking unit, wherein the bolt receiver selectively secures a bolt inserted into the bolt receiver against a removal therefrom or releases the bolt for a removal therefrom, wherein the bolt receiver is associated with an adjustable locking element, a lock cylinder disposed at the second end face of the locking unit, wherein the lock cylinder is rotatable by a key and wherein the lock cylinder actuates the adjustable locking element, wherein the sleeve includes an end wall at the first axial end and is open at the second axial end, wherein the locking unit is introducible via insertion into the sleeve, with the lock cylinder receiver at a leading end of insertion, wherein, in an introduced state, the locking unit is fixed in the sleeve by a fixing device, and wherein the end wall of the sleeve includes a passage opening for the leading through of the key to be inserted into the lock cylinder.

2. The two-wheeler lock in accordance with claim 1, further comprising a cover for covering the second axial end of the sleeve, wherein the cover is fastened to the sleeve and has a cover opening for the leading through of the bolt to be inserted into the bolt receiver.

3. The two-wheeler lock in accordance with claim 2, wherein the cover is screwed onto the sleeve.

4. The two-wheeler lock in accordance with claim 3, wherein a screw mount is formed at the sleeve and defines a screw axis extending parallel to the longitudinal axis of the sleeve, wherein the screw mount is provided for screwing the cover onto the sleeve.

5. The two-wheeler lock in accordance with claim 1, further comprising a closure for covering the open axial end of the sleeve, wherein the closure is fixedly connected to the locking unit or is designed in one piece therewith and is arranged at the first or second end face of the locking unit that defines a trailing end of insertion of the locking unit into the sleeve.

6. The two-wheeler lock in accordance with claim 1, wherein the fixing device secures the locking unit, which is introduced into the sleeve, to the sleeve via screws.

7. The two-wheeler lock in accordance with claim 6, wherein the locking unit has a housing for accommodating the bolt receiver, the locking element, and the lock cylinder, and wherein a flange is formed at the housing, wherein the flange is configured for being secured to an inwardly disposed web of the sleeve via the screws.

8. The two-wheeler lock in accordance with claim 1,
wherein the fixing device has a latching mechanism for latching the locking unit introduced into the sleeve to the sleeve.

9. The two-wheeler lock in accordance with claim 1,
wherein the sleeve is configured for a welding to a frame of a two-wheeler or for a welding into a recess of a frame of a two-wheeler.

10. The two-wheeler lock in accordance with claim 1, wherein the two-wheeler lock is a bicycle lock.

11. The two-wheeler lock in accordance with claim 1, wherein the insertion unit is one of an insertion cable or an insertion chain.

12. The two-wheeler lock in accordance with claim 1, wherein the locking unit is selectively introducible.

13. The two-wheeler lock in accordance with claim 2, wherein the cover is releasably fastenable to the sleeve.

14. The two-wheeler lock in accordance with claim 4, wherein the bolt includes a collar formed on the bolt, wherein the collar has a diameter greater than an insertion portion of the bolt, wherein the collar is configured to block access to a screw head when the bolt is inserted such that removal of the cover is permitted when the bolt is removed from the bolt receiver.

15. The two-wheeler lock in accordance with claim 2, wherein when the bolt receiver is disposed adjacent the end wall of the sleeve when the locking unit is inserted in the sleeve, and the bolt is locked against a removal from the locking unit, the locking unit is blocked from removal from the sleeve.

16. A two-wheeler lock for an insertion unit, said two-wheeler lock comprising:

a locking unit having two opposite end faces, and a sleeve for attachment to or in a frame of the two-wheeler, the sleeve having a longitudinal axis and two opposite axial ends, a bolt receiver disposed at the first end face of the locking unit, wherein the bolt receiver selectively secures a bolt inserted into the bolt receiver against a removal therefrom or releases the bolt for a removal therefrom, wherein the bolt receiver is associated with an adjustable locking element, a lock cylinder disposed at the second end face of the locking unit, wherein the lock cylinder is rotatable by a key and wherein the lock cylinder actuates the adjustable locking element, wherein the sleeve includes an end wall at the first axial end and is open at the second axial end, wherein the locking unit is introducible via insertion into the sleeve, with the lock cylinder or the bolt receiver at a leading end of insertion, wherein, in an introduced state, the locking unit is fixed in the sleeve by a fixing device, wherein the end wall of the sleeve includes a passage opening for the leading through of the key to be inserted into the lock cylinder or of the bolt to be inserted into the bolt receiver;

a cover for covering the second axial end of the sleeve, wherein the cover is fastened to the sleeve and has a cover opening for the leading through of the bolt to be inserted into the bolt receiver or of the key to be inserted into the lock cylinder; and wherein the cover is screwed onto the sleeve.

17. A two-wheeler lock for an insertion unit, said two-wheeler lock comprising:

a locking unit having two opposite end faces, and a sleeve for attachment to or in a frame of the two-wheeler, the sleeve having a longitudinal axis and two opposite axial ends, a bolt receiver disposed at the first end face of the locking unit, wherein the bolt receiver selectively secures a bolt inserted into the bolt receiver against a removal therefrom or releases the bolt for a removal therefrom, wherein the bolt receiver is associated with an adjustable locking element, a lock cylinder disposed at the second end face of the locking unit, wherein the lock cylinder is rotatable by a key and wherein the lock cylinder actuates the adjustable locking element, wherein the sleeve includes an end wall at the first axial end and is open at the second axial end, wherein the locking unit is introducible via insertion into the sleeve, with the lock cylinder or the bolt receiver at a leading end of insertion, wherein, in an introduced state, the locking unit is fixed in the sleeve by a fixing device, wherein the end wall of the sleeve includes a passage opening for the leading through of the key to be inserted into the lock cylinder or of the bolt to be inserted into the bolt receiver;

wherein the fixing device secures the locking unit, which is introduced into the sleeve, to the sleeve via screws.

* * * * *